Patented Apr. 10, 1945

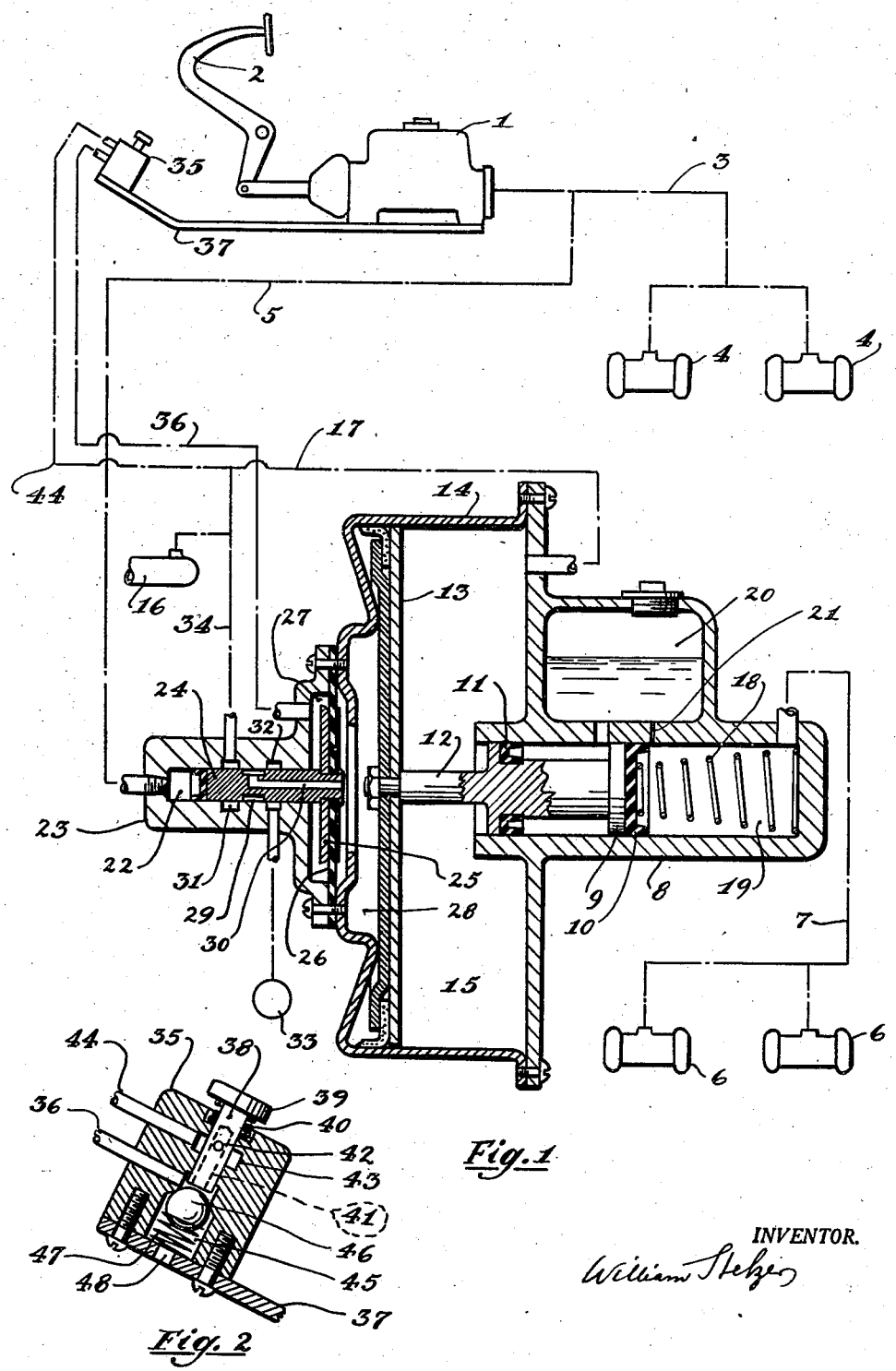

2,373,272

UNITED STATES PATENT OFFICE 2,373,272

BRAKING SYSTEM

William Stelzer, Detroit, Mich.

Application November 7, 1942, Serial No. 464,864

8 Claims. (Cl. 188—152)

The invention relates to braking systems and more particularly to a hydraulic braking system for automotive vehicles where the brakes of the wheels of one axle are applied manually through a hydraulic circuit, and the remaining brakes on the same vehicle are applied through a separate circuit operated by a source of power.

The primary object of the invention is to provide a novel braking system consisting of two separate hydraulic circuits so that after one of them should fail, the other continues to function. This feature is intended to contribute to the safety of the vehicle, especially where service is severe, as for instance in military cars and trucks where damage should not render the brakes inoperative.

Another object is to provide a novel and improved power brake which is greatly simplified in construction and whose operation is modulated so that the hydraulic pressure produced is in proportion or equal to the hydraulic pressure in the manual circuit.

The invention also introduces a novel emergency or safety valve operated by the brake pedal after failure of the manually operated brake circuit, said valve serving to control the power unit of the power brake circuit.

Other objects and advantages of this invention will be apparent from the following detailed description considered in connection with the accompanying drawing submitted for the purpose of illustration and not intended to define the scope of the invention, reference being had for that purpose to the subjoined claims. In the drawing, wherein similar reference characters refer to similar parts:

Fig. 1 is a diagram of the novel braking system, showing the power brake unit or pressure producing device in a sectional elevation; and Fig. 2 a sectional view of the emergency valve which controls the power brake in case of failure of the manually operated braking system.

Before explaining in detail the present invention it is to be understood that the invention is not limited in its application to the details of construction and arrangement of parts illustrated in the accompanying drawing, since the invention is capable of other embodiments and of being practised or carried out in various ways. Also it is to be understood that the phraseology or terminology employed herein is for the purpose of description and not limitation.

Describing the invention now in detail, I refer to a hydraulic braking system for an automotive vehicle having two axles. 1 denotes a hydraulic master cylinder of the conventional type operated by a foot pedal 2 to produce a hydraulic pressure in line 3 leading to wheel cylinders 4 which serve to actuate the brakes of the wheels of one axle, say for instance the front axle. The elements described pertain to an inddependent hydraulic braking system operated manually by the operator, but a line 5 serves to communicate the hydraulic pressure of this system to control a power brake circuit consisting of wheel cylinders 6 receiving fluid under pressure through line 7 from a power operated master cylinder 8 having a piston 9 with seals 10 and 11 and a piston rod 12 engaging the piston 13 of an expansible motor mechanism whose cylinder 14 is secured to master cylinder housing 8 to form a chamber 15 which is in communication to a source of vacuum or low pressure represented by intake manifold 16 through line 17. A spring 18 ordinarily urges piston 9 into its "off" position so that the fluid in chamber 19 is in communication with the fluid in reservoir 20 through port 21.

Line 5 carrying the hydraulic pressure of the manual circuit leads to chamber 22 of the control cylinder 23 to act on a slidable valve plunger 24 carrying a diaphragm piston 25 and diaphragm 26 which also serves as a seal between valve housing 23 and power motor housing 14 to form chambers 27 and 28. Plunger 24 has a groove 29 permanently in communication with chamber 28 through hole 30. Valve housing 23 has internal grooves 31 and 32. The latter is open to a source of pressure 33. The pressure may be atmospheric, or it may be above atmospheric, whereby 33 would represent a pump or other source of higher pressure. Groove 31 is open to a source of low pressure 16 through line 34. The pressure in chamber 27 is controlled by emergency valve 35 through line 36. The emergency valve is mounted to a support 37 which may be a structural part of the vehicle. As shown in Fig. 2, a slidable valve plunger 38 with a push button 39 is held yieldingly in a released position by a spring 40, whereby line 36 is in communication with the source of low pressure 16 through holes 41 and 42, internal groove 43, and line 44. The lower portion of the valve body 35 has a bore 45 housing a ball 46 urged in a seated position by a spring 47. Hole 48 is open to the atmosphere or other source of pressure.

Having thus described the invention, I shall now explain the operation of the same. For this purpose it is assumed that the system is in the "off" position as shown on the drawing, and that the operator commences to depress the brake pedal to apply the brakes. The hydraulic pressure resulting from the operation of master cylinder 1 is transmitted through line 3 to wheel cylinders 4 which actuate the brakes of the front wheels. The pressure is also transmitted through line 5 to chamber 22 to force valve plunger 24 to the right until groove 29 registers with internal groove 32 to admit air from 33 into chamber 28, causing a differential pressure to act on piston 13 and to move it towards master cylinder 8, increasing the hydraulic pressure in chamber 19 as soon as port 21 is covered by piston 9, thus energizing wheel cylinders 6 and applying the brakes of the rear wheels. It will be noted that chamber 27 is under vacuum pressure similar to chamber 15 because valve 35 remains open. The pressure differential acting on diaphragm 26 opposes the hydraulic pressure in chamber 22 to produce a modulating action so that the pressure differential acting on piston 13 is in a predetermined proportion to the hydraulic pressure in the manually operated circuit, so that as a final result the hydraulic pressure in wheel cylinders 6 is in a predetermined proportion to the hydraulic pressure in wheel cylinders 4. As may readily be seen, any admittance of too much power into chamber 28 would immediately result in an unbalance of the air pressure acting on diaphragm 26 to oppose the hydraulic pressure in chamber 22, the air pressure would overpower the hydraulic pressure, and plunger 24 would move to the left to shut off the supply of power and to relieve the excessive pressure as soon as groove 29 registers with groove 31.

Supposing that the operator releases the brake pedal to release the brakes, the relief of the pressure in line 5 and consequent relief of pressure in chamber 22 permits the air pressure acting on diaphragm 26 to move valve plunger 24 into a released or "off" position where groove 29 registers with groove 31 and chamber 28 is evacuated so that pistons 13 and 9 return to the "off" position by virtue of spring 18, so that the pressure in the hydraulic circuit 7 is relieved and the brakes are disengaged.

Valve 35 merely serves in an emergency when the manual hydraulic circuit is defective or inoperative so that the brake pedal can be pushed down against the floor board. At the end of the stroke the brake pedal depresses button 39, whereby plunger 38 is pressed against ball 46 so that first passage 41 is closed off and then ball 46 is unseated to allow air to pass from hole 48 through bore 45 and line 36 into chamber 27. The air pressure acting on diaphragm 26 urges plunger 24 to the right until groove 29 registers with groove 32 and air pressure from 33 is transmitted to chamber 28 to apply the power brake. As soon as brake pedal 2 is released valve 35 returns to its original position allowing chamber 27 to be evacuated and the valve 24 consequently returned to the position where chamber 28 is in communication with the source of vacuum 16, and the power brake is released.

It is apparent that the invention can be carried out in ways different from that shown, thus for instance cylinders 4 may represent the brake actuators for the rear axle, and 6 those of the front axle. In vehicles with dual axles the power brake unit may operate the wheel cylinders of a plurality of axles.

Having thus described my invention, I claim:

1. In a hydraulic braking system for a vehicle, a master cylinder operated by a foot pedal, a set of wheel cylinders of said vehicle in communication with said master cylinder to be actuated by the latter, a motor mechanism operable by differential elastic fluid pressures, a hydraulic master cylinder operated by and mounted co-axial with said motor mechanism to actuate another set of wheel cylinders on said same vehicle, a source of power, a valve to direct power to and from said expansible motor mechanism, means responsive to the hydraulic pressure of said master cylinder which is operated by said foot pedal to actuate said valve, and pressure sensitive means directly responsive to differential pressures in said motor mechanism to oppose said means responsive to the hydraulic pressure of said master cylinder to produce a modulated valve action which causes the hydraulic pressure in said power operated master cylinder to be in a pre-determined proportion to the hydraulic pressure produced by said master cylinder operated by the foot pedal.

2. In a hydraulic braking system for an automotive vehicle having wheels, in combination, a master cylinder operated by the operator, a master cylinder operated by an expansible motor mechanism, wheel cylinders to actuate the brakes, one set of wheel cylinders being energized by said master cylinder operated by the operator and another set of wheel cylinders on said vehicle being actuated by said master cylinder operated by said expansible motor mechanism, a source of power to operate said expansible motor mechanism, valve means to direct power to and from said expansible motor mechanism, pressure sensitive means to operate said valve means and an emergency valve arranged to be operated by the operator at the end of the stroke of said master cylinder operated by the operator, to energize said pressure sensitive means and to urge said valve means to direct power to said expansible motor mechanism.

3. In a hydraulic braking system for a vehicle, a master cylinder operated by a foot pedal, a set of wheel cylinders in communication with said master cylinder to be actuated by the latter, a hydraulic master cylinder operated by and mounted co-axial with an expansible motor mechanism to actuate another set of wheel cylinders on said vehicle, a source of power, a valve to direct power to and from said expansible motor mechanism, means responsive to the hydraulic pressure of said master cylinder which is operated by said foot pedal to actuate said valve, pressure sensitive means responsive to the power directed to said expansible motor mechanism to oppose said means responsive to the hydraulic pressure of said master cylinder to produce a modulated valve action which causes the hydraulic pressure in said power operated master cylinder to be in a pre-determined proportion to the hydraulic pressure produced by said master cylinder operated by said foot pedal, and an emergency valve operated by said foot pedal to control said valve.

4. The construction as claimed in claim 3, where said emergency valve is arranged to be operated by said foot pedal at the end of its stroke to direct power to said expansible motor mechanism.

5. In a hydraulic braking system for a vehicle having wheels provided with brake cylinders, a manually operable master cylinder having fluid transmitting connection with one set of brake cylinders, a power operable master cylinder having fluid transmitting connection with another set of brake cylinders, a source of power for operating said power operable master cylinder, a control mechanism for said power source arranged to be operated by fluid displaced from said manually operable master cylinder, and common means for operating said manually operable master cylinder and for energizing said source of power independently of the displacement of fluid from said manually operable master cylinder.

6. In a hydraulic braking system for a vehicle having wheels provided with brake cylinders, a manually operable master cylinder having fluid transmitting connection with one set of brake cylinders, a power operable master cylinder having fluid transmitting connection with another set of brake cylinders, a differential fluid pressure operated motor for operating said power operable master cylinder, a control valve for said motor arranged to be operated by fluid displaced from said manually operable master cylinder, and common means for operating said manually operable master cylinder and for operating said valve mechanism independently of the displacement of fluid from said manually operable master cylinder.

7. In a hydraulic braking system for a vehicle having wheels provided with brake cylinders, a manually operable master cylinder having fluid transmitting connection with one set of brake cylinders, a power operable master cylinder having fluid transmitting connection with another set of brake cylinders, a source of power for operating said power operable master cylinder, a control mechanism for said power source arranged to be operated by fluid displaced from said manually operable master cylinder, a pedal for operating said manually operable master cylinder, and means, including a movable element, for energizing said power source independently of the displacement of fluid from said manually operable master cylinder, said movable element being arranged to be operable upon a brake-operating movement of said pedal.

8. In a hydraulic braking system for a vehicle having wheels provided with brake cylinders, a manually operable master cylinder having fluid transmitting connection with one set of brake cylinders, a power operable master cylinder having fluid transmitting connection with another set of brake cylinders, a differential fluid pressure operated motor for operating said power operable master cylinder, a control valve for said motor arranged to be operated by fluid displaced from said manually operable master cylinder, a pedal for operating said manually operable master cylinder, and means, including a movable element, for effecting a motor-energizing operation of said valve mechanism independently of the displacement of fluid from said manually operable master cylinder, said movable element being arranged to be operated upon a brake-operating movement of said pedal.

WILLIAM STELZER.